United States Patent
Speth

[15] 3,655,954
[45] Apr. 11, 1972

[54] CLOSED LOOP CONTROL SYSTEM WITH AUTOMATIC VARIATION OF ITS REGULATING FEEDBACK AMPLIFICATION

[72] Inventor: Winfried Speth, Erlangen, Germany
[73] Assignee: Siemens Aktiengesellschaft, Berlin, Germany
[22] Filed: Dec. 17, 1969
[21] Appl. No.: 885,691

[30] Foreign Application Priority Data

Dec. 20, 1968 Germany..................P 18 15 964.3

[52] U.S. Cl..........................235/150.1, 318/615, 318/561
[51] Int. Cl..................G05b 17/02, G06g 7/18, G069 7/48
[58] Field of Search...............235/150.1, 150.2; 318/561, 318/615

[56] References Cited

UNITED STATES PATENTS

3,241,027   3/1966   Albright..................................318/561

Primary Examiner—Eugene G. Botz
Attorney—Curt M. Avery, Arthur E. Wilfond, Herbert L. Lerner and Daniel J. Tick

[57] ABSTRACT

In a closed-loop control system the regulated system portion has a number ($n$) of integration members. The regulator feedback which is connected between output and input of the regulated system portion comprises regulator control means for automatically adapting the amplification of the regulator to variations in amplification occurring in the regulated system portion during operation of the latter. The regulator control means comprise a first differentiating stage of the $(n+1)$-th order, an at least partial analog of said regulated system portion, a quotient-forming divider having two inputs of which one is connected through the first differentiating stage to the output of the regulated system portion and the other is connected through the analog to the input of the regulated system portion. A second differentiating stage is connected with the analog and adapted for phase coincidence of the two signals at the respective two inputs of the quotient-forming divider.

16 Claims, 9 Drawing Figures

CLOSED LOOP CONTROL SYSTEM WITH AUTOMATIC VARIATION OF ITS REGULATING FEEDBACK AMPLIFICATION

My invention relates to closed-loop control systems whose forward path, constituting the main system portion to be regulated, has its output feedback-connected with its input for controlling or regulating the input quantity in dependence upon the delivered output quantity.

More specifically, the invention concerns closed-loop systems whose regulated main or forward portion comprises between input and output a number ($n$) of integration members, and has for its object to provide, during operation of this regulated system portion, an automatic adaptation of the regulating feedback amplification to changes in amplifying gain occurring in the regulated system portion.

Before further dealing with the invention proper, the following is offered as background information and for the purpose of definition.

A closed-loop control system, also called feedback control system, is composed of two component portions, namely a controlling or regulating portion and a controlled or regulated system portion, the latter constituting the forward path of the quantity being regulated. For example, if the regulated quantity is steam pressure, the regulated system (main portion of the entire organization) includes the pressure supply and the pressure control valve from which this component system extends to the pressure output point at which the regulated steam pressure is to appear. The valve or other control member constitutes a branch point and responds to a command signal from the controlling or regulating system which includes a feedback from the output side of the regulated system to the branch point. The command signal varies the setting of the control member and thereby changes the quantity passing through the regulated system (forward path). At some point of the loop or at several points, or along a stretch of the loop, there may be introduced one or more disturbances, and these have a falsifying effect upon the control of the regulated system in which they become in effect amplified in the sense of a multiplication. That is, the control magnitude as well as any disturbance affecting the flow of the controlled quantity in the regulated system are much smaller in intensity than the changes in the quantity thus subjected to control, this resulting in the just-mentioned amplifying effect occurring in the regulated system.

Relative to the terminology used in this specification and to the servo-type of block diagrams shown in several illustrations of the accompanying drawings, reference may be had to "Feedback Control Systems" by Gille, Pelegrin and Decaulne, McGraw-Hill Book Co., New York, 1959, pages 7 to 22 and 771; also to "Analysis of Feedback Control Systems" by Bruns and Saunders, McGraw-Hill Book Co., New York, 1955, pages 1 to 6, 208 and 226; and to "Elektronische Analogiegeraete" by Dietrich Ernst, published in the German periodical "Regelungstechnik", Vol. 6, 1958, Nos. 3 to 6.

The "regulated quantity" is either the ultimate quantity itself (also called "actual" or "real" quantity), such as the pressure of the steam to be controlled or regulated in the example selected for illustration above, or the voltage of a regulated electrical system. However, the "regulated quantity" may also be constituted by some other physical quantity, usually an electrical voltage, that varies in proportion to, or in some other definite dependence upon, the ultimate quantity to be regulated. For example, if the steam pressure in the above-mentioned example is measured electrically, a voltage varying in proportion to the actual steam pressure may constitute the "regulated quantity" in the meaning of the present disclosure; or if the speed of a vehicle is the actual quantity to be controlled or regulated, the speed-proportional voltage furnished from a tachometer generator may serve as the "regulated quantity". Because of the applicability of such secondarily variable quantities, the "regulated quantity" is often called "pilot" quantity or magnitude, regardless of whether or not it is the "actual" or "real" quantity. The datum or reference quantity is indicative of the value at which the regulated (pilot, real, or actual) quantity is to be maintained and is sometimes called "pattern" quantity, especially if it can be set to any chosen value, for example by adjusting a potentiometer or if it is varied in accordance with a given time program or with a change in temperature or other parameter.

It is necessary, as a rule, to adjust the regulating system (feedback) to the parameters of the regulated system (controlled forward path) for attaining the best feasible dynamic transfer function of the loop organization. If the loop amplification varies during operation, a regulating system initially optimalized may no longer provide optimal regulating performance but may become maladjusted to changed parameters of the regulated system.

It is known that optimal regulation requires that the amplification in the regulating system (regulator) of the closed-loop organization maintain a definite ratio to the amplification occurring in the regulated (forward path) system of the organization. If the regulated system is subjected to operationally occurring disturbance effects, for example variations in temperature, the amplification of the regulated system portion may change so that the desired ratio is no longer maintained. It has been found that of the various disturbing influences, only those will change the regulated-system amplification that operate in a multiplicative sense, whereas disturbing influences acting only in an additive sense, such as most load disturbance magnitudes, do not have such an effect.

It is therefore a more specific object of my invention to provide closed-loop regulating system organizations with automatically operating means which identify the change in forward-path amplification stemming from multiplicatively acting disturbance influences, and which then impose upon the amplification of the regulator (i.e. the feedback or regulating-system portion) of the organization an effect that compensates such change in regulated-system amplification.

It is known for similar purposes to continually subject the regulated system to given test signals in order to achieve an identification of its path parameters. When this method is applied to a regulated system while this system is in operation, the regulated quantity is always modified by an effect stemming from the superimposed test signal. Although this effect can be kept slight, it may nevertheless cause undesired disturbances. Furthermore, this method must carefully provide for always uniform test signals, and this, as a rule, involves a considerable amount of additional equipment and expense.

It is, therefore, a further object of my invention to perform the above-mentioned identification, without the use of test signals, by utilizing the regulated-quantity signal appearing at the end of the regulated (forward-path) system.

A more specific object of the invention is to filter out of the regulated-quantity signal any disturbances that act additively upon the regulated-system path, even if the regulated system contains one or more integration members.

To achieve these objects, and in accordance with my invention, relating to a closed-loop control organization in which the regulated system (forward path) has a number ($n$) of integration members and which has a regulator system feedback-connected between output and input of the regulated system, comprises regulator control means for automatically adapting the amplification of the regulator to the variations in amplification occurring in the regulated system during operation of the latter. The regulator control means comprise a first differentiating stage of the ($n+1$)-th order, and an at least partial analog, such as a substitute circuit network, of the regulated system, further a quotient-forming divider stage which has one of its two inputs connected through the first differentiating stage to the output of the regulated system, the other input being connected through the analog to the input of the regulated system. A second differentiating stage is connected with the analog to provide for phase coincidence of the two signals at the respective two inputs of the quotient-forming divider stage.

It is the fundamental concept of this invention to have the differentiating stages operate to eliminate from the regulated quantity signal those disturbing effects that act additively upon the regulated system; and to place the thus filtered signal into relation with an in-phase signal occurring at the end of a signal path which is impressed by the control quantity (output signal of the regulating feedback system) and which is a disturbance-free model (analog) of the regulated system.

The second differentiating member is of the first order when the regulated system does not contain an integrating member ($n=0$); generally, the order of the first differentiating member, depending upon the type of regulated-system analog being used, is determined by the requirement that on the analog signal path up to the quotient-forming stage the control signal must be subjected to the same frequency characteristic as along its path through the regulated system and the integrating member following the regulated system. It is essential that with this identification of the regulated-system amplification, the result is obtained independently of the magnitude of the operationally occurring control-signal magnitude, and that it is not necessary to know the frequency of occurrence, type and point of attack of the individual disturbance magnitudes themselves.

According to a further feature of the invention, it is preferable to arrange the second differentiating member ahead of the regulated-system analog, seen in the signal propagation direction. This is of significance if the regulated-system analog contains at least one integrating member. In this case, the regulated system itself would possess at least one integrating member ($n \neq 0$), and hence the control-signal quantity in the stationary state (fully regulated condition without error signal) would not be zero but would have to compensate the load. Consequently, if the control-quantity signal were directly impressed upon the input of the regulated-system analog, a virtually infinitely large control range would have to be provided for the integrators of the regulated-system analog. However, if the differentiating member is disposed ahead of the regulated-system analog, the integrators of the analog are affected only by changes of the control-quantity signal so that a finite control range for the integrators is sufficient.

Further objects, advantages and features of my invention will be described in, and will be apparent from, the following description of embodiments of closed-loop regulating systems according to the invention illustrated schematically and by way of example on the accompanying drawings in which:

The same reference characters are applied in the various illustrations for corresponding items respectively. The system components shown only by block symbols are known as such, for example from the literature mentioned above.

Figure 1:
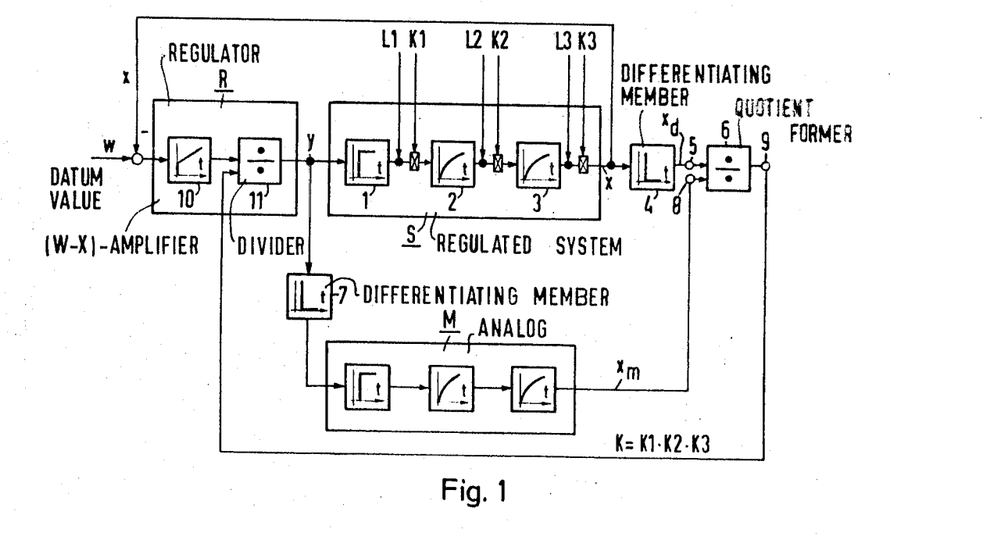
FIG. 1 shows the diagram of a complete feedback control system in a relatively simple over-all configuration.

In FIG. 1, a regulator R furnishes an output signal $y$ which constitutes the control magnitude for varying the quantity passing through the regulated system (forward path) S of the illustrated closed-loop organization. The regulated quantity $x$ appearing at the output of the regulated system portion S (hereinafter simply called "regulated system") is compared at the input of the regulator R with a datum magnitude $w$. The result, constituting the "error signal" or "deviation", is supplied to the regulating amplifier 10 of the regulator R. In the example represented in FIG. 1, the regulated system S comprises two time-constant members 2 and 3 and a dead-time member 1; that is, the regulated system S in this example does not contain an integrating member ($n=0$). It is assumed that before and behind the individual regulating-system members 1, 2 and 3, multiplicatively acting disturbances K1, K2, K3 are effective, as well as additively acting disturbances L1, L2 and L3, the rate of change of all of these disturbances being small in comparison with those of the other variable quantities of the closed-loop organization. Among the multiplicatively acting disturbance influences there may be operational changes in amplification in the regulated-system members 1, 2 and 3. Only the multiplicatively acting disturbance effects falsify the amplification of the regulated system S, and the product of these effects is to be identified with the aim of eliminating the influence of disturbance magnitudes K1 to K3 by an opposing variation in amplifying gain of the regulator R.

For this purpose, the regulated quantity $x$ is passed through a differentiating member 4 to the input terminal 5 of a divider, i.e. a quotient-forming stage 6, the terminal 5 being coordinated to the dividend input as contrasted to the divisor input terminal 8. A second signal path is provided for the control quantity $y$ and extends through a further differentiating member 7 and an analog or substitute circuit (image) M of the regulated system S to the divisor input 8 of the quotient former 6.

The regulated-system analog M is a complete model of the regulating system S differing therefrom only by the fact that no operational disturbance effects L1 to L3 and K1 to K3 act upon the model. The differentiating members 4 and 7 have the same rating and are both of the first order. They serve to keep the signals $x_d$ and $x_m$ at the quotient former 6 free from the influence of the additively acting disturbances L1 to L3.

The signals $x_m$ and $x_d$ are in phase with each other. As can be confirmed by an analysis of the frequency characteristic of the two signal paths for the control quantity $y$ up to the respective inputs 5 and 8 of the quotient former 6, the quotient $x_d/x_m$ at any moment precisely corresponds to the product $K=$K1·K2·K3 of all disturbance quantities acting multiplicatively upon the regulated system S. If the amplification of the regulator R is influenced in inversely proportional relation to the magnitude $K$, for example as illustrated in FIG. 1 by a divider device denoted by 11, then any operational variation of $K$ or the actually effective regulating-system amplification is exactly compensated by a counteracting change in regulator amplification. The regulating loop organization as a whole thus remains continuously optimized.

Figure 2:
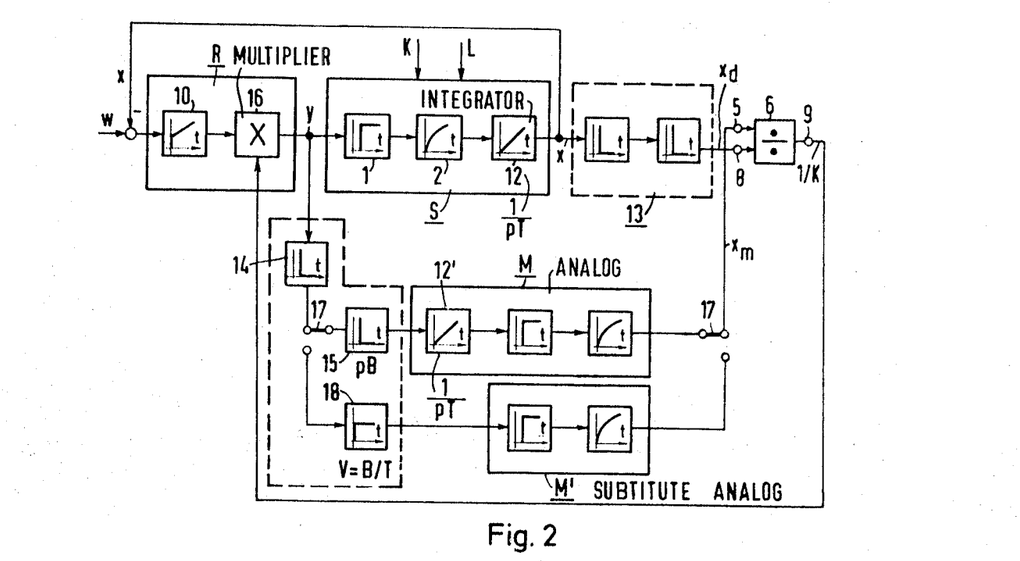
FIG. 2 is the diagram of a similar system equipped with a more elaborate regulator (feedback portion) than the system of FIG. 1.

In the embodiment shown in FIG. 2, the regulated system S contains an integrating member 12 with the frequency characteristic $1/pT$ ($n=1$). Such a regulating system would correspond, for example, to that of a direct-current drive energized through current rectifiers, in which case the dead-time member represents the statistical running time of the rectifier, the time-constant member represents the armature circuit, and the integrating member represents the mechanical flywheel mass of the motor. As in the embodiment of FIG. 1, it is assumed that additively and multiplicatively disturbances may be active at any locality, especially in the signal-flow direction, and hence also ahead of the integrating member 12, these disturbance effects being cumulatively denoted by L and K. For eliminating the additive disturbances L there is provided a differentiating member 13 of the second order which, for example, is composed of the series connection of two first-order differentiating members such as those denoted by 4 and 7 in FIG. 1. Another differentiating member of the second order is provided in the parallel signal path for the control quantity signal $y$, and consists of the series connection of two differentiating members 14 and 15. The output signal of the differentiating member 15 is applied to a complete but disturbance-free analog M of the regulating system S. The signal $x_d$ appearing at the output of the differentiating member 13 and the signal $x_m$ appearing at the output of the analog M are in phase with each other and, due to the filtering action of the differentiating members employed, do not contain any components stemming from the additively acting disturbance magnitudes L. In distinction from the embodiment of FIG. 1, the signal $x_m$ is supplied to the dividend input 5 of the quotient-forming stage 6, whereas the signal $x_d$ is supplied from the output of the differentiating member 13 to the divisor input 8. Consequently, at the output terminal 9 of the quotient former 6 there will appear a magnitude $1/K$ which is inversely proportional to the product $K$ of the multiplicative disturbance effects and which acts through a multiplier 16 to vary the amplifying gain of the regulator R in analogy to the variation effected in the embodiment of FIG. 1. As a result, any variations in regulated-system amplification are compensated.

The parallel signal path of the control quantity $y$ can be simplified by taking advantage of the fact that the series connection of a differentiating member and an integrating member is equivalent to a mechanically simpler proportionality member. Such a simplification is also embodied in the system according to FIG. 2. As shown, there are two switches 17. When these are shifted from the illustrated horizontal positions to the vertical positions, the analog M is inactive and is substituted by an analog M', and the differentiating member 15 having an idealized frequency characteristic $pB$ is substituted by a proportional characteristic member 18 having the amplifying factor $V=B/T$. The substituted analog M' does not contain the analog of the integrating member 12, in this respect being also simpler than the complete regulated-system analog M. A corresponding simplification is obtained generally for n integrating members in the regulating system S as follows. The regulated system signal $x$ is filtered by means of a differentiating member of the $(n+1)$-th order and thus converted to a signal $x_d$ in which the components stemming from additive disturbance signals are eliminated. The signal $x_m$ to be compared with the filtered signal $x_d$ must have the same phase as the latter. This is the case if the frequency characteristics of the two signal paths available to the control-quantity signal $y$ up to the respective inputs 5 and 8 of the quotient former 6 differ only from each other by a constant factor. For that reason, a differentiating member of the $(n+1)$-th order is also included in the parallel signal path of the control magnitude $y$ that contains the complete regulating-system analog M, and a differentiating member up to the $n$-th order is branched-off therefrom and is connected together with a corresponding number of integrating members of the regulating-system analog so as to obtain a member of purely proportional characteristics. Actually, therefore, the parallel signal path to be provided for the control-quantity $y$ need, in the extreme, contain only one differentiating member of the first order and an analog M' of the regulated system no longer containing any integrating member. In practice, it will depend upon individual requirements whether it is preferable to entirely eliminate the integrating members in this manner or whether they are to be only partly omitted from the regulating-system analog.

As far as described, it has been ignored that ideally differentiating filters having the transfer functions shown on the drawing for the members 4, 7, 13, 14, 15 and 18 are not in practice obtainable and consequently do not have the ideal frequency characteristic $pB$. In reality, the frequency characteristic of the differentiating filter is always of the form $pB/(1+pA)$ in which A and B are constant coefficients and $p = j\omega$ denotes the frequency. The term $1+pA$ is called the "parasitic denominator" of the differentiating member.

Figure 3:
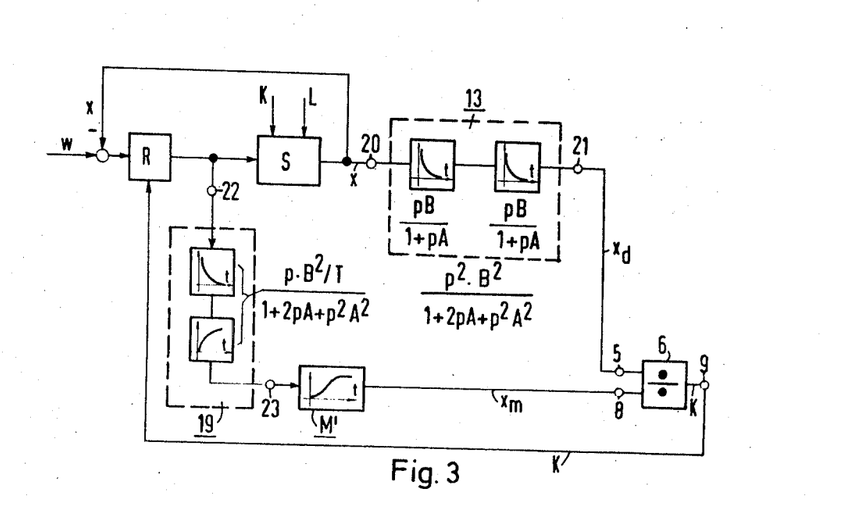
FIG. 3 shows diagrammatically a third embodiment of a complete closed-loop regulating system.

FIG. 3 shows a practically applicable form of the differentiating members in a modification which results when the two switches 17 in FIG. 2 are placed from the illustrated horizontal to the vertical positions, except that the quotient-forming stage 6 in FIG. 3 does not provide the quantity $1/K$ but the quantity $k$, and that the latter quantity is to act in inverse proportion upon the amplification of the regulator R. The differentiating member 13 of the second order, connected between the terminals 20 and 21 in FIG. 3, is shown to consist, for example, of the series connection of two differentiating members of the first order and of the above-mentioned kind, thus exhibiting the frequency characteristic $p^2 \cdot B^2/(1+pA)^2$. The series connection in the parallel signal path of the differentiating member 14 as well as of the proportional member 18, according to FIG. 2, is obtained by providing a differentiating member of the first order having the frequency characteristic $pB/(1+pA)$ and a time delay member having the frequency characteristic $pB/(1+pA)$, so that the differentiating member 19 between terminals 22 and 23 has the resultant frequency characteristic $p \cdot B^2/T(1+pA)^2$. Consequently, the parasitic denominators of the two differentiating members 13 and 19 are equal. The regulated-system analog M' does not contain the analogon 12' corresponding to the integrating member 12 of the regulated system S; the two signals $x_d$ and $x_m$ are in phase with each other and can be placed into quotient relation to each other for automatic adjustment of the regulator amplification.

It should be noted that for the purposes of the invention the time-constant coefficients A and B can be chosen entirely at will, it being only essential that in the example illustrated in FIG. 3 the regulated quantity $x$ be subjected twice and the control quantity $y$ only once to differentiation. In the division, the parasitic denominators as well as the coefficients B cancel each other so that, independently of the course of the control-quantity signal $y$ as well as of the specific design of the differentiating members, as long as they meet the above-mentioned requirements, the magnitude available at the output terminal 9 of the quotient-forming stage 6 will always correspond to the actually occurring amplification of the regulated system S.

Figure 4:
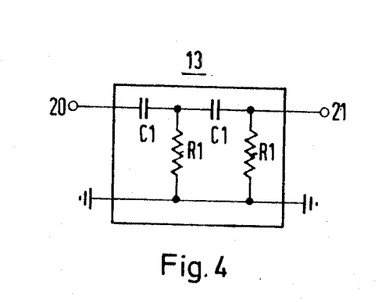
FIG. 4 exemplifies the circuit diagram of a differentiating member applicable in any of the systems shown in FIGS. 1 to 3.

FIG. 4 illustrates an example of electrical circuitry for the differentiating member 13 (FIGS. 2, 3) which is composed of passive electrical components only. This member consists of an RC differentiating network formed of two capacitors C1 and two ohmic resistors R1.

Figure 5:
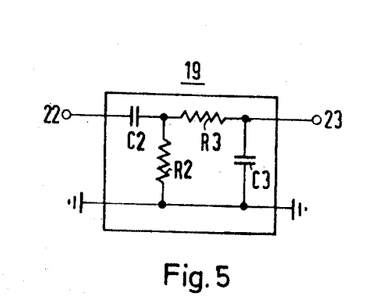
FIG. 5 is a circuit diagram of a differentiating member applicable in a system as shown in FIG. 3.

FIG. 5 illustrates an electrical circuit design of the differentiating member denoted by 19 in FIG. 3 and comprises an input network C2, R2 which is a differentiating network corresponding to that of FIG. 4, whereas the component network composed of the resistor R3 and the capacitor C3 constitutes a time delay network. The resistors R2, R3 and capacitors C2 and C3 can be dimensioned in accordance with conventional rules so that, in consideration of the integrating time T of the integrating member 12 (FIG. 2) contained in the regulated system S, the frequency characteristics of the differentiating members 13 and 19 meet the above-mentioned requirements. Of course, the necessary frequency characteristics of the two differentiating members 13 and 19 may also be secured with the aid of active electrical components, that is, by means of operation amplifiers known from analog computer techniques and employing the methods usual with analog computers.

In each of the system embodiments so far described with reference to FIGS. 1 to 3, the two input signals at the quotient-forming stage 6, upon changes of the control magnitude $y$, differ from zero and in most cases will decay while oscillating about the zero value. Since these two signals are in phase with each other, both will several times vanish simultaneously during identification, and at these moments the signal issuing (at terminal 9) from the quotient-forming stage will be indefinite or indeterminable, or in any event would not reliably correspond to the instantaneous regulated-system amplification. It is therefore also a more specific object of my invention to avoid such uncertainties.

For this purpose, and in accordance with another feature of my invention, the closed-loop organization is provided with a quotient-forming stage which, upon vanishing of its input signals stores the output signal. This can be done in a particularly simple manner by providing the quotient-forming stage of the system organization with an integrator in negative feedback connection with a multiplier. Although other signal-storing means are applicable for the same purpose, the one just described results in particularly simple equipment.

If the regulated system may operate under stationary conditions throughout long periods of time, this being expectable especially with a so-called fixed-magnitude (on-off) regulation, the regulated quantity ($x$) may not change for long periods of time and consequently the input signals of the quotient-forming stage will exhibit the zero value for correspondingly prolonged periods. To make certain that the quotient-forming stage will provide a correspondingly extended storing of the previously processed output signal, and according to a further feature of my invention, the integrator contained in the quotient-forming stage may be designed as a digital digital counter which is preceded by a voltage-frequency converter and followed by a digital-analog converter.

Figure 6:
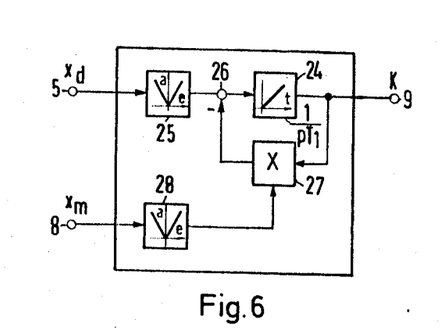
FIG. 6 is a diagram of a memorizing quotient-forming stage applicable in any of the systems shown in FIGS. 1 to 3.

FIG. 6 shows an embodiment of such a memorizing quotient-forming stage, in which in the event of simultaneous disappearance of its input quantities $x_d$ and $x_m$ at the respective terminals 5 and 8, the previously determined quotient $x_d/x_m$ is stored and thus remains "frozen". This is essentially achieved by the storing ability of an integrator 24, which, upon disappearance of its input signal, retains its output signal. The input signal of integrator 24 consists of the output signal of an amount-forming stage 25 which receives the magnitude $x_d$ as the dividend and whose block symbol in FIG. 6 represents the relation $a = |e|$ between its output magnitude $a$ and its input magnitude $e$. A negative feedback signal is subtracted at a mixing point 26 from the output signal of the amount-forming stage 25. The subtracted signal is constituted by the output signal of a multiplier 27 which has one input impressed by the output magnitude of the integrator 24 and whose other input receives the output signal of another amount-forming stage 28, the input of stage 28 receiving the quantity $x_m$. The output signal of the integrator 24 does not change its value when its input quantity is equal to zero, that is, when there obtains the relation $x_d = K \cdot x_m$, wherein $K$ is the output quantity of the integrator 24. When the values of $x_d$ and $x_m$ differ from zero, the output signal of the integrator will automatically adjust itself upon the value $K = x_d/x_m$; when the quantities $x_d$ and $x_m$ simultaneously vanish, the above-mentioned relation is likewise satisfied, and the previously determined value of $K$ is retained as the integrator output signal. Preferably, the integrating time $T_1$ of the integrator 24 is chosen sufficiently short so that the quotient $K = x_d/x_m$ is always rapidly available.

Since a reliable identification may be doubtful at very minute input signals of the quotient-forming stage 6 (FIGS. 1 to 6), my invention pursues the further object of suppressing such minute input signals.

According to another feature of the invention, therefore, the output of the voltage-frequency converter is preferably connected with the input of an AND-gate whose other input is connected to the output of a threshold-quantity sensor impressed by the input magnitude of the voltage-frequency converter.

The input quantities of the quotient-forming stage 6 which are to be placed in ratio relation to each other, oscillate at the same phase and hence have alternating polarities. The identification of the regulated-system amplification, however, depends only upon the scalar amount of these magnitudes. Consequently, and as described with reference to FIG. 6, the input quantities for the quotient-forming stage can be passed through amount-forming members onto the input of the integrator and of the multiplier. However, if the input magnitude that arrives at the quotient forming stage from the regulated system, contains a noise signal or another periodic high-frequency spurious signal, such undesired signal content would be rectified by an amount-forming member and thus could falsify the result of the identification.

In such cases, it is advisable, according to a further feature of my invention, to give the quotient-forming stage a different design in which the input magnitude for the multiplier in the negative feedback circuit of the integrator is applied to a function generator through which this input magnitude acts upon a further multiplier arranged in the input circuit of the integrator for modulating the integrator input voltage in dependence upon the instantaneous polarity or in dependence upon polarity as well as amplitude of this input quantity. As a result, spurious signals of the above-mentioned kind no longer reach the input of the integrator in rectified condition and are suppressed by the storing effect of the integrator. In this arrangement, the correct regulating sense in the regulating circuit, composed of the integrator and the multiplier negatively feedback-connected with that integrator, is obtained in a simple manner, and there is the possibility of increasing the operating speed of the quotient-forming stage at low input signals.

In cases where the integrator is realized by means of analog-type components and an indefinitely long storability is not required, it is advantageous according to another feature of my invention, to apply to the integrator a slight and constant additional feed voltage leading to a definite limit, so that in stationary operation at vanishing input signals of the quotient-forming stage the integrator will remain at a definite limit stop so chosen that the output signal of the quotient-forming stage then is set to the maximally possible regulator amplification. In this waiting setting, i.e. up to the occurrence of the next change in control-quantity signal, the regulator remains adjusted to highest sensitivity. Consequently, when the next regulating departure occurs, the regulator exhibits a particularly rapid starting phase of operation up to attaining the fully regulated state (disappearance of the deviation or error).

Figure 7:
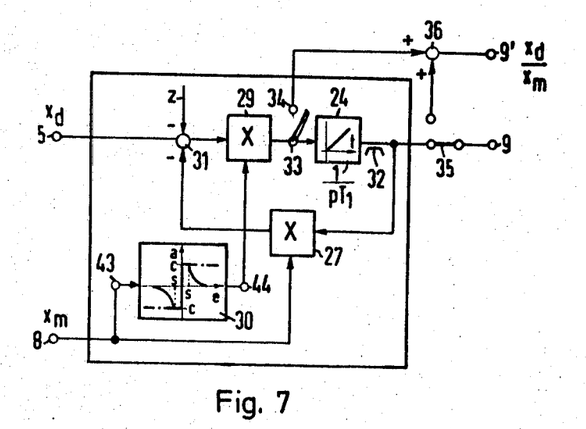
FIG. 7 is a diagram of another modification of a memorizing quotient-forming stage, also suitable for systems according to FIGS. 1 to 3.

The features and improved results just mentioned apply to the embodiment shown in FIG. 7 illustrating a memorizing quotient-forming stage which, in systems generally corresponding to FIGS. 1, 2 or 3, is applicable instead of the embodiment according to FIG. 6. The integrator 24 and its negative feedback by means of a multiplier 27 are retained so that a storing of the result is secured in the manner described with reference to FIG. 6. In distinction to the embodiment of FIG. 6, however, the magnitudes $x_d$ and $x_m$ themselves rather than their scalar amounts act upon the input and negative feedback of the integrator 24. Contrary to FIG. 6, any superimposed high-frequency noise contained in the input signal $x_d$ is not rectified by the action of the amount-forming stage 25 but reaches as a superimposed alternating quantity the input of the integrator 24 and is smoothed or suppressed by the storing effect of this inegrator as long as the inverse value of the integrating time $T_1$ of the integrator 24 is sufficiently short relative to the noise frequencies present, which as a rule is the case. Since the quantities $x_d$ and $x_m$ may exhibit alternating polarities, the change in polarity sign of the two quantities occurring simultaneously on account of their phase concidence, a change in sign of the quantity $x_m$ causes inverse poling of the integrator input signal so that the regulating sense of the regulating circuit, composed of the integrator 24 and the two multipliers 27 and 29, does not change. The above-mentioned reversal in polarity of the integrator input signal is produced with the aid of a function generator 30 whose input terminal 43 receives the quantity $x_m$ and whose output, appearing at terminal 44, is applied to one of the two inputs of the multiplier 29. The other input of this multiplier receives the difference between the input signal $x_d$ and the output signal of the multiplier 27.

For securing the correct regulating sense, the function generator 30 would have to perform no more than the function of reversing the polarity. Hence its characteristic could have the course indicated by a dot-and-dash line on block symbol 30 in FIG. 7, in which case the function generator would act as a flip-flop amplifier. For adaptation to the input signal amplitudes, however, it is preferable if the function generator 30 has the hyperbolic characteristic shown by full lines on the block symbol. For an input signal $e$ below the small threshold value $s$, this characteristic is described by the relation $a = c\cdot\text{sign}(e)$, wherein $c$ is a constant and which characteristic for input signals exceeding the threshold value, is represented by the hyperbolic relation $a \approx 1/e$, wherein $a$ represents the output quantity of the function generator 30. The integrator 24 thus receives an input quantity which becomes independent of the amplitudes of the signals $x_d$ and $x_m$ and depends only upon the ratio of these signals. The working speed of the integrator, i.e. the time elapsing until its output signal corresponds to the desired ratio, is always the same, assuming that during the period of time under consideration, the effect of disturbing quantities is constant at large and small amplitudes of the input quantities $x_d$ and $x_m$. The mentioned hyperbolic characteristic of the function generator 30 thus secures a constant identification time.

When in the stationary state of the regulated system S, the control quantity $y$ has remained constant for a prolonged period of time, both input quantities $x_d$ and $x_m$ become equal to zero. If the integrator 24 is constituted by analog means, for example with the aid of an electronic amplifier having a capacitive negative feedback, it may happen that the output voltage of the integrator will drift at uncontrollable slow rate to one or the other stable state. To prevent this, a slight constant additional feed-in quantity $z$ at the mixing locality 31 is provided and leads the output of the integrator 24 to a defined limiting stop denoted by 32, at which stop the output signal of the integrator 24 exhibits a small value only slightly differing from zero. This limit stop can be provided in known manner with the aid of limiting diodes at the output of the integrator 24.

When the output quantity of the integrator is located at this limit, the quantity K is adjusted to its lowest possible value and consequently the amplification gain of the regulator to its largest possible value. In this condition, the regulator amplification would be adjusted to a much higher gain than required by the optimizing criterion and higher than would be permitted by the stability conditions. This, however, has no disadvantageous consequences as long as the control quantity $y$ does not change. With each change of the control magnitude, that is, with the occurrence of a new regulating departure between the datum value W and the regulated quantity $x$, a very small additional signal $z$ is overpowered by the now appearing input signals $x_d$ or $x_m$; the quotient former again comes under the influence of these quantities and then sufficiently rapidly identifies the actual value of the regulated-system amplification with the corresponding reduction with the regulator amplification down to the value provided for the optimal regulating performance, thus avoiding sufficiently early the danger of the regulating circuit becoming instable. It has been found that by virtue of this amplification of the regulator, intentionally set excessively large in the stationary state, as well as by the subsequent setting down to the correct value as soon as the stationary state vanishes, a much faster full regulation in the event of regulating departures or errors is obtained than with a regulator which, relative to its amplifying gain, has permanently the optimal adaptation to the regulated system. This will also be understood from the fact that the speed at which any occurring regulating departure will be eliminated, will in principle, be higher, the higher the regulator amplification is chosen. Hence, if at the beginning of a regulating operation the maximally attainable regulator amplification is applied, such amplification — if permanently effective — being most likely the cause of oscillations with increasing amplitudes, and when such maximal regulator amplification is reduced sufficiently early to the value needed for stable optimal operation, then the regulating performance in totality is apt to take less time than when this reduced value of regulating amplification had been in effect from the very start.

If it is considered disadvantageous that the integrator 24 requires a certain amount of time for performing the identification, that is if it is desirable at any moment to have the quotient $x_d/x_m$ available as a measure of the regulated-system amplification, then a modification can be used which results from the one shown in FIG. 7 by closing an additional connection between the terminals 33 and 34, and by opening the switch 35. The performance of this variant will be understood if one considers that a quantity containing at any moment a magnitude proportional to the ratio $x_d/x_m$ is already present at the end of the signal path leading through the function generator 30 and the multiplier 29, i.e. at the output of the multiplier 29. That is, the signal appearing at the terminal 33, in view of the hyperbolic conversion by the function generator 30, is represented by $x_d/x_m - K$, wherein $K$ designates the instantaneous output signal of the integrator 24. If, therefore, at a mixing locality 36 the output signal of the integrator 24 is added, then the voltage at the terminal 9' corresponds at any moment to the ratio $x_d/x_m$. The variant just described, therefore, affords immediate identification as well as storing of the integrator output signal in the event the input signals at terminals 5 and 8 vanish simultaneously.

Figure 8:
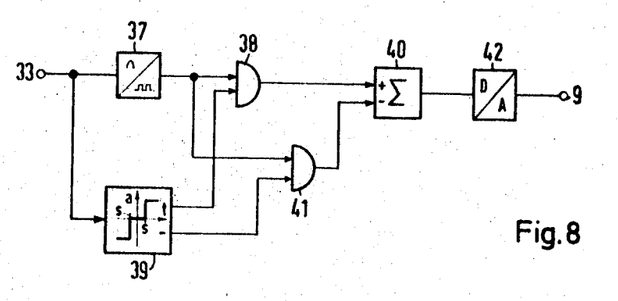
FIG. 8 is a logic circuit diagram of an integrating device composed of digital component suitable as an integrator in devices according to FIGS. 6 and 7.

FIG. 8 shows an integrating device composed of digital components which is applicable as integrator 24 in systems corresponding to FIGS. 6 and 7 and which is completely free of drift. The device of FIG. 8 comprises a voltage-frequency converter 37 which converts an analog input voltage applied to the terminal 33 into a sequence of pulses whose sequence frequency is proportional to the input voltage. The pulses act upon one input of each of two AND-gates 38 and 41, whose second inputs are connected to the output signals of a threshold-value member 39. It is the purpose of the threshold member 39 to block the AND-gates 38 and 41 when the input voltage at terminal 33 has amplitudes below a threshold $s$, but to open the gates for the pulses of the voltage-frequency converter 39 whenever the input-signal amplitudes are above the threshold value. Such a blocking of very small input amplitudes may be preferable in view of the fact that at too small input signals a reliable operation of the quotient-forming stage would be doubtful. The output of the AND-gate 38 is connected to the forward counting input of a bi-directional counter 40. The output of the AND-gate 41 is connected to the reverse counting input of the same counter 40 and is effective at negative amplitudes of the input voltage applied to the terminal 33. The counter 40 thus operates as a digital storer. Its output magnitude is converted in a digital analog converter 42 due to an analog voltage signal which appears at the output terminal 9.

According to a further feature of the invention, the above-mentioned function generator for modulating the integrator input voltage may simply consist of an amount-forming stage followed by an inverting amplifier circuit, a switching amplifier being provided for reversing the poling of the output signal of the inverting amplifier in dependence upon the polarity of the input signal at the amount-forming circuit. The inverting amplifier itself can be realized by means of an amplifier of a high amplifying gain impressed by a constant voltage and having its output signals limited to maximal positive and negative values, a multiplier being arranged in the negative feedback branch of the high-gain amplifier and impressed by the output signal of the amount-forming member. The amount-forming member may simply be composed of the series connection of an inverting amplifier with a diode, a second diode of the same forward direction being connected in parallel to the series arrangement of amplifier and first diode.

With the above-described amplitude modulation of the integrator input voltage, the integrator input voltage increased by the magnitude of the integrator output signal can be employed as the output signal of the quotient-forming stage which acts upon the regulating-system amplification. In this manner, a particularly rapid identification and consequently an especially rapid adaptation of the regulating-system amplification can be secured.

Figure 9:
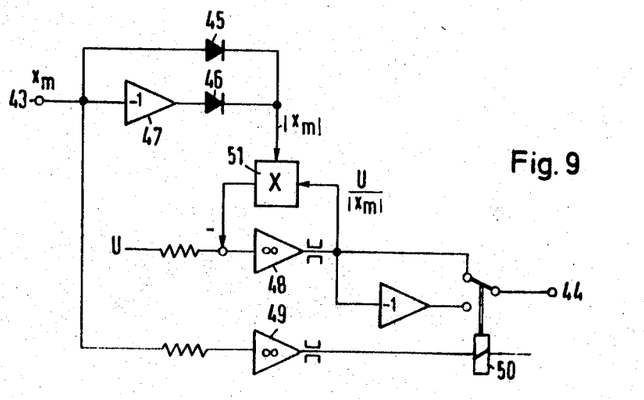
FIG. 9 exemplifies by a schematic diagram a function generator suitable for use in a quotient-forming stage according to FIG. 7.

FIG. 9 illustrates an example embodying the last-mentioned combination of features of the invention in a function generator applicable in lieu of the one denoted by 30 in FIG. 7. In accordance with the symbolism of analog-computing techniques, electronic amplifiers in FIG. 9 are represented by a triangular symbol in which the appertaining amplifying factors are indicated. The input magnitude $x_m$ applied to the input terminal 43 is first supplied to an amount-forming stage composed of two diodes 45, 46 and a reversing amplifier 47. The output signal $|x_m|$ of the amount-forming stage acts upon one of the two inputs of a multiplier 51 which forms part of a negative feedback coupling for another amplifier 48. The input quantity of the amplifier 48 is a constant direct voltage U. Consequently, the output of the amplifier 48 furnishes a quantity proportional to the inverse value of the scalar amount of $x_m$. The quantity $x_m$ further acts upon the flip-flop amplifier 49 which in turn actuates a switching member constituted in the illustrated example by a polarized electromagnetic relay 50. In accordance with the polarity of the input magnitude $x_m$ the output signal of the amplifier 48, representing an inverse value amplifier, is supplied to the terminal 44 either directly or with reversed poling, so that the function shown in the block symbol 30 of FIG. 7 will occur at the output terminal 44 in dependence upon the input signal. The indicated output limitation at the amplifier 48 secures defined maximal output voltages for small values of $x_m$ below a given threshold value which in FIG. 7 is denoted by s, whereas at larger values of $x_m$ the output voltage of the amplifier 48 will decrease hyperbolically.

As will be seen from the embodiments described in the foregoing, system organizations according to the invention operate by automatically counteracting any departure of the regulated-system amplification from the predetermined value defined by the constant amplification of the regulated-system analog. As a consequence, there is also achieved a remarkable improvement in facility with respect to the dimensioning of the regulator and the avoidance of the often rather time-consuming adjusting expedients for the initial starting-up of the regulating loop system. This is because amplification of the regulated-system analog can be fixed to a presumed value without knowing the amplification of the regulated system itself. It is advisable to select for this purpose any amplifying value located in the range of changes in regulated-system amplification. In other words, it is possible to adjust the regulator from the outset in accordance with the estimated value of any selective optimizing criterion under consideration. When thereafter the regulating loop system is put into operation, the departure of the actual regulated-system amplification from the originally assumed value is identified by the equipment according to the invention in the same manner as if a disturbing quantity were active; and the action then resulting upon the regulator amplification then takes care of compensating for the departure. Empirical adjustments at the installation site thus are minimized or virtually eliminated.

It has further been found that the analog of the regulated system need not be highly accurate, especially any regulated-circuit members of higher order can be approximated by analog members of lower order without appreciable detriment to the intended functioning of the system according to the invention.

To those skilled in the art, ti will be obvious upon a study of this disclosure, that my invention permits of various modifications and uses other than those particularly illustrated and described herein, without departing from the essential features of my invention and within the scope of the claims annexed hereto.

I claim:

1. In a closed-loop control system comprising a regulated system portion having a number ($n$) of integration members, a regulator, and a regulator feedback-connected between the output of said regulated system portion and the input of said regulator, the combination of regulator control means for automatically adapting the amplification of the system to the variations in amplification occurring in the regulated system portion during operation of the latter, said regulator control means comprising said regulator, a first differentiating stage of the ($n+1$)-th order, and at least two partial analogs of said regulated portion, a quotient-forming divider stage having an output and two inputs of which one is connected through said first differentiating stage to the output of said regulated system portion to receive therefrom a regulated signal through said first differentiating stage, a second differentiating stage, said other input of said divider stage being connected to the input of said regulated system portion through said analogs and said second differentiating stage for supplying said other input with a modified regulated-system input signal phase coincident with said output signal at said respective divider inputs, said output of said divider stage being connected to said regulator.

2. In a system according to claim 1, said regulator comprising means for receiving an error signal and having an amplification control stage connected to said regulated system portion to furnish said input signal thereto, said control stage having an amplification controlling input connected to said output of said divider stage to receive a control signal therefrom.

3. In a system according to claim 1, said regulator comprising a quotient forming stage having an output connected to said regulated system portion to furnish said input signal thereto, said stage of said regulator having two inputs and means for applying an error signal to one of them, said other input of said regulator stage being connected to the output of said divider stage to receive a control signal therefrom.

4. In a system according to claim 1, said second differentiating stage being series-connected with said analog and arranged ahead of said analog in the propagating direction of said input signal 5. In a system according to claim 1, said quotient-forming divider stage having means for storing the stage output signal upon vanishing of its input signals.

6. In a system according to claim 5, said signal storing divider comprising a multiplier and an integrator forming a negative feedback of said multiplier.

7. In a system according to claim 6, said integrator comprising a digital counter, a voltage-frequency converter preceding said counter in the signal flow direction, and a digital-analog converter following said counter.

8. In a system according to claim 7, said integrator comprising two AND-gates having respective inputs connected to the output of said voltage-frequency converter, and a threshold sensor controlled by the input of said voltage-frequency converter and having an output connected to respective other inputs of said AND-gates, and means connecting the respective outputs of said AND-gates to said digital-analog converter.

9. A system according to claim 6, comprising two amount-forming members connected ahead of, and passing respective input signals to, said integrator and said multiplier respectively.

10. A system according to claim 6, comprising constant-voltage means connected to said integrator for supplying thereto an additional constant feed voltage to thereby set a given limit for said integrator.

11. A system according to claim 6, comprising a second multiplier having two inputs and an output of which one input and the output are connected in the input circuit of said divider stage, a function generator connected to said feedback-connected multiplier of said integrator and controlled by said modified regulated-system input signal for modulating the integrator input voltage in dependence upon the polarity of said voltage.

12. In a system according to claim 11, said function generator comprising an amount-forming stage, an inverse-value amplifier in follower connection with said amount-forming stage, a switching amplifier connected to said inverse-value amplifier for reversing the polarity of the output signal in dependence upon the input signal of said amount-forming stage.

13. In a system according to claim 12, said inverse-value amplifier comprising a high-gain amplifier with constant voltage supply means and having output signals limited to positive and negative maxima, said high-gain amplifier having a negative feedback circuit, and a multiplier connected in said feedback circuit and having a control input connected to the output of said amount-forming stage of said function generator.

14. In a system according to claim 13, said amount-forming stage of said function generator comprising an inverting amplifier and a diode in series connection with each other.

15. In a system according to claim 13, said quotient-forming divider stage having a quotient output signal constituted by the integrator input signal increased by the output signal of said integrator.

16. In a system according to claim 9, said amount-forming stages comprising an inverting amplifier and a diode in series connection with each other.

* * * * *